United States Patent
Lee et al.

(10) Patent No.: US 8,774,503 B2
(45) Date of Patent: Jul. 8, 2014

(54) METHOD FOR COLOR FEATURE EXTRACTION

(75) Inventors: Gwo Giun (Chris) Lee, Tainan (TW); He-Yuan Lin, Tainan (TW); Ming-Jiun Wang, Tainan (TW); Chun-Fu Chen, Tainan (TW)

(73) Assignee: National Cheng Kung University, Tainan (TW)

( * ) Notice: Subject to any disclaimer, the term of this patent is extended or adjusted under 35 U.S.C. 154(b) by 104 days.

(21) Appl. No.: 13/456,291

(22) Filed: Apr. 26, 2012

(65) Prior Publication Data

US 2012/0301019 A1 Nov. 29, 2012

Related U.S. Application Data

(60) Provisional application No. 61/478,965, filed on Apr. 26, 2011.

(51) Int. Cl.
*G06K 9/00* (2006.01)

(52) U.S. Cl.
USPC .......................................................... 382/164

(58) Field of Classification Search
CPC ... G06K 9/00; G06K 9/00718; G06K 9/3233; G06K 9/38; G06K 9/4652; G06K 9/6212; G06K 9/6218; G06K 9/6223; G06K 9/6226; G06T 7/0079; G06T 7/0081; G06T 7/0083; G06T 7/0087; G06T 7/403; G06T 11/001; G06T 2207/10024; G06T 2207/20148; G06F 17/3025; G06F 17/30802; H04N 1/58; H04N 1/60; H04N 1/6027; H04N 1/62; H04N 1/64; H04N 9/64; H04N 9/643; H04N 9/67
See application file for complete search history.

(56) References Cited

U.S. PATENT DOCUMENTS

| | | | | |
|---|---|---|---|---|
| 6,571,228 B1 * | 5/2003 | Wang et al. | ..................... | 706/16 |
| 6,625,308 B1 * | 9/2003 | Acharya et al. | ............... | 382/168 |
| 6,628,827 B1 * | 9/2003 | Acharya | ....................... | 382/167 |
| 6,658,399 B1 * | 12/2003 | Acharya et al. | ................. | 706/52 |
| 7,158,178 B1 * | 1/2007 | Acharya | ....................... | 348/280 |

FOREIGN PATENT DOCUMENTS

| CN | 101207829 B | 3/2011 |
|---|---|---|
| CN | 101833772 B | 7/2012 |

* cited by examiner

*Primary Examiner* — Jose Couso
(74) *Attorney, Agent, or Firm* — Bacon & Thomas, PLLC

(57) ABSTRACT

A method for color feature extraction extracts a color feature vector representative of the color of each image pixel contained in an image signal. The method comprises: receiving the image signal; mapping the image signal to a color space model, where the color of each of the plural image pixels is represented by a first parameter, a second parameter, and a third parameter; obtaining an adjusted second parameter; clustering the plural image pixels into plural color regions or plural fuzzy regions of a color plane of the color space model; and designating the color feature vector to each of the plural image pixels based on the clustering result.

10 Claims, 4 Drawing Sheets receiving the image signal including plural image pixels, each image pixel having a color ~A mapping the image signal to a color space model, enabling the color contained by each of the plural image pixels to be respectively mapped to a corresponding point in the color space model, the corresponding point having a coordinate represented by a first parameter, a second parameter, and a third parameter, the color space model including a color plane composed of plural color regions and plural fuzzy regions ~B comparing the third parameter with an adjustment threshold value to have a comparison result, and obtaining an adjusted second parameter based on the comparison result and the second parameter ~C sequentially clustering each of the color provided by the plural image pixels into one of the plural color regions or one of the plural fuzzy regions of the color plane according to the first parameter and the adjusted second parameter ~D designating a color feature vector to each of the plural image pixels according to a result of clustering ~E

FIG. 1

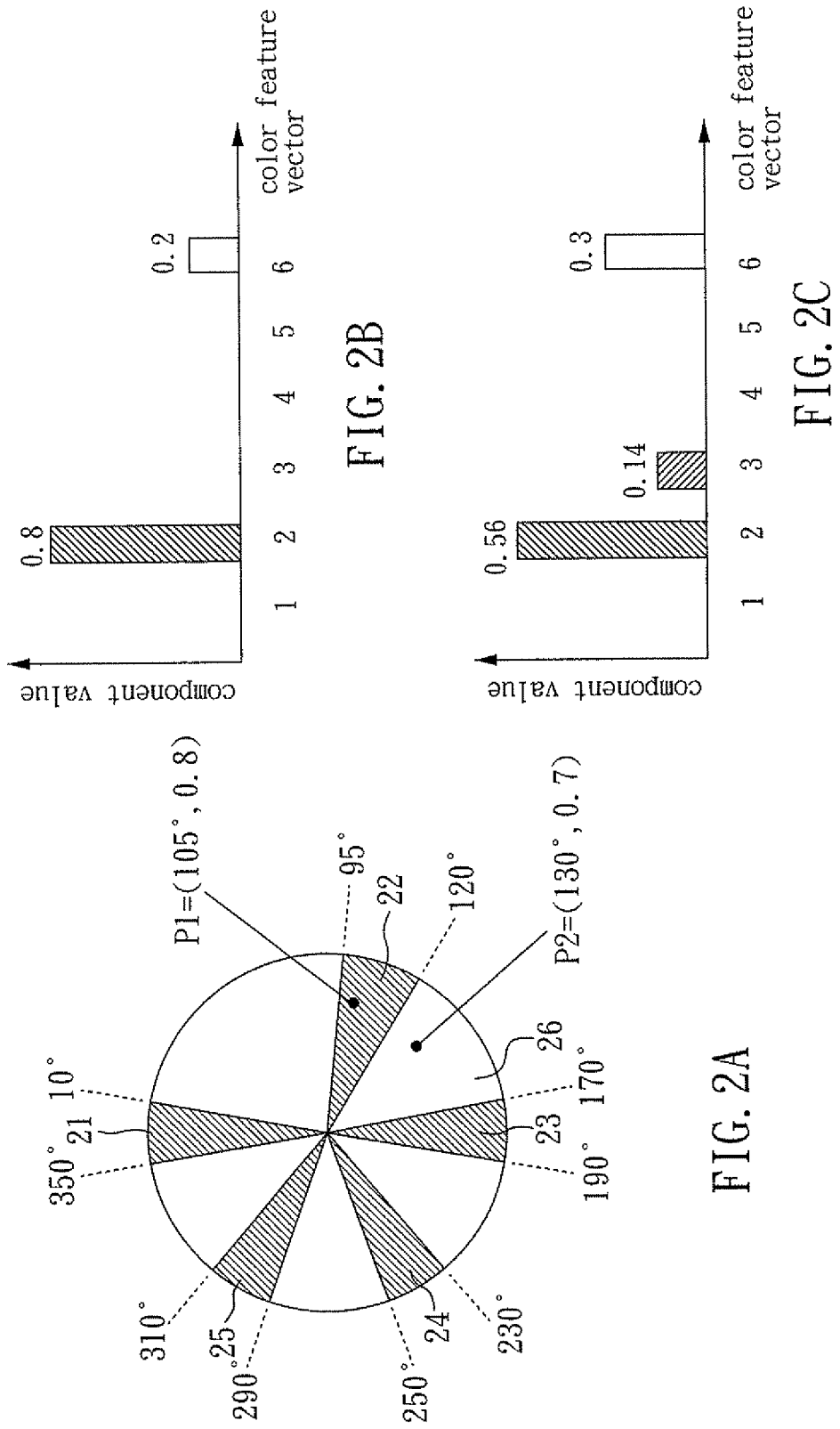

METHOD FOR COLOR FEATURE EXTRACTION

CROSS REFERENCE TO RELATED APPLICATION

This application claims the benefit of filing date of U.S. Provisional Application Ser. No. 61/478,965, entitled "Method for Converting from a 2-Dimensional Video to a 3-Dimensional Video" filed Apr. 26, 2011 under 35 USC §119(e)(1).

BACKGROUND OF THE INVENTION

1. Field of the Invention

The present invention relates to a method for color feature extraction and more particularly, to a method capable of precisely and rapidly extracting a color feature vector representative of the color of an image pixel contained in an image signal, and designating the color feature vector to the image pixel.

2. Description of Related Art

With the development of Internet and computer technology, application of multi-media becomes more and more popular in modern life. Unlike the conventional manner of message communication in which persons communicate with each other mostly by context, more static or dynamic image information is further attached nowadays. With the attached image information, it allows the message delivery to become more splendid and more colorful.

Image processing technique is also being improved in response to the aforementioned image signal delivery, such as image segmentation, image synthesis, image recognition, or the popular 2-Dimensional to 3-Dimensional video converting technique. With the popularity of 3D movies, the 2-Dimensional to 3-Dimensional video converting technique is promoted and becomes an even much hot topic for research. Thus, no matter for industry or for academic purpose, lots of efforts are spent in chasing 2-Dimensional to 3-Dimensional video converting technique with higher quality.

In the 2-Dimensional to 3-Dimensional video converting technique, the extraction of color feature of an image signal is deemed as a significant process. Traditionally, when desiring to extract the color feature of an image signal, a specific color space model will be selected at first, such as an HSI color space model. The selected HSI color space model has a color plane, and the color plane is segmented uniformly. Generally speaking, the color plane is segmented into five color regions and each represents different color, such as red color region, green color region, cyan color region, blue color region, and magenta color region. Additionally, the image signal being converted to this HSI color space model carries several parameters with different information. According to the parameters carried by the image signal, the image signal will be clustered to distinguished color regions of the aforementioned segmented color plane; moreover, the image signal is then determined to have what sort of color feature based upon the above process.

However, during the process of segmenting the color plane, the boundary of different color regions varies continuously, for example, the boundary varied from red color region to green color region appears to be red to greed, and therefore the vicinity of the boundary forms a fuzzy region. A corresponding point located in such a fuzzy region is difficult to be judged what exact color the corresponding point is no matter by human eye or by computer. Hence, during the process of segmenting the color plane, different result of color plane segmentation is obtained due to different sensing on color for each person.

As a result, once the color of an image pixel of an image signal is clustered to the aforementioned fuzzy region such as the boundary with color appeared to be red to greed, the color of the image pixel would possibly be judged as red by a certain person, but judged as green by another person. Hence, discrepancy occurs resulting in severely influencing the quality on color feature extraction. Therefore, how to improve the judging criterion while the color of an image pixel is clustered to fuzzy region will become an object desired to be improved in modern 2-Dimensional to 3-Dimensional video converting technique.

Accordingly, the industry needs a method for color feature extraction capable of precisely and rapidly extracting a color feature vector representative of the color of an image pixel contained in an image signal, and designating the color feature vector to the image pixel.

SUMMARY OF THE INVENTION

The object of the present invention is to provide a method for color feature extraction capable of precisely and rapidly extracting a color feature vector representative of the color of an image pixel contained in an image signal, and designating the color feature vector to the image pixel.

Another object of the present invention is to provide a method for color feature extraction capable of avoiding color recognition error due to discrepancy on color sensing when the color of the image pixel contained in an image signal is clustered into fuzzy regions of a color plane.

To achieve the object, there is provided a method for color feature extraction, adopted to extract color feature from an image signal, comprising the steps of: (A) receiving the image signal including plural image pixels, each image pixel having a color; (B) mapping the image signal to a color space model, enabling the color contained by each of the plural image pixels to be respectively mapped to a corresponding point in the color space model, the corresponding point having a coordinate represented by a first parameter, a second parameter, and a third parameter, the color space model including a color plane composed of plural color regions and plural fuzzy regions; (C) comparing the third parameter with an adjustment threshold value to have a comparison result, and obtaining an adjusted second parameter based on the comparison result and the second parameter; (D) sequentially clustering each of the color provided by the plural image pixels into one of the plural color regions or one of the plural fuzzy regions of the color plane according to the first parameter and the adjusted second parameter; and (E) designating a color feature vector to each of the plural image pixels according to a result of clustering.

Wherein, the image signal can be projected to a color space model of any type. Examples include HIS color space model, RGA color space model, YUV color space model or CMY color space model. Furthermore, when the image signal is projected to an HIS color space model, the first parameter in step (B) is of a hue component, the second parameter is of a saturation component, and the third parameter is of an intensity component. This means, with one aspect of the present invention, the color of each of the image element of an image signal will first be transferred to this HIS color space model, making the color contained by each image element be projected to a corresponding point in the HSI color space model.

The coordinate of such corresponding point is represented by a hue component (H), a saturation component (S), and an intensity component (I).

Next, in the foregoing color space model, a color plane is composed of a plurality of color regions and a plurality of fuzzy regions. Wherein, a partitioning of the plurality of color regions and the plurality of fuzzy regions works to conduct segmentizing on the color plane. However, there is no limit on the means for conducting color plane segmentization, and whether it is needed to segmentize the color plane to produce one or a plurality of fuzzy regions. For example, a color plane may be equally segmentized into 6 color regions according to one method of color plane segmenization (the result of which is 6 color regions having an equal size), and each color region is designated with different colors. This means that this color plane segmentization method would not result in production of fuzzy regions on the color plane. In another aspect, 3 color regions may be produced from segmentization on the color plane (the color regions produced in this case are not guaranteed to be of an equal size), and the neighboring two color regions form a fuzzy region. This means that this color plane segmentation can form 3 fuzzy regions on the color plane (the color regions produced in this case are not guaranteed to be of an equal size).

However, in the present invention, it is preferable to segmentize to produce a plurality of fuzzy regions. As such, 5 color regions would first be produced from segmentization, including one first color region, a second color region, a third color region, a fourth color region and one fifth color region. The portions on the color plane that are not covered by these color regions are defined as a plurality of fuzzy regions. In other words, any neighboring two color regions can form a fuzzy region. Besides, in an embodiment of the invention, a first color region is defined as a red color region, a second color region is defined as a green color region, a third color region is defined as a cyan color region, a fourth color region is defined as a blue color region, a fifth color region is defined as a magenta color region. In addition, in step (C) of the color feature extraction method of the present invention, cross-compare the intensity component and an adjusted threshold value of the image element. And in an embodiment of the present invention, this adjusted threshold value is between 70 to 90, but is preferred to be 85. Next, if the intensity component of the image pixel is higher than the adjusted threshold value, an adjusted saturation component can be determined from the following formula:

$$S'=a+b*S;$$

Wherein, S' is the adjusted saturation component, S is the saturation component, a and b are two random positive numbers, and satisfy the condition of a+b=1.

However, when the intensity component is not higher than the adjusted threshold, an adjusted saturation component can be determined from the following formula:

$$S' = (a+b*S)*\left(\frac{I}{T}\right);$$

Wherein, S' is the adjusted saturation component, S is the saturation component, T is the adjusted threshold value, a and b are each two random positive numbers, and satisfy the a+b=1 condition.

Next, in step (D) of the color feature extraction of the present invention, the color contained by a plurality of image elements in an image signal can be categorized into any of the 5 color regions, or categorized into any of the 5 fuzzy regions.

Wherein, when the color contained in an image element is categorized into any of the foregoing 5 color regions, the image pixel is designated with a first component, a second component, a third component, a fourth component, a fifth component, and a sixth component. Also, the first component corresponds to the red color region, the second component corresponds to the green color region, the third component corresponds to the cyan color region, the fourth component corresponds to the blue color region, the fifth component corresponds to the magenta color region, the sixth component corresponds to an achromatic region.

In addition to this, the value of the sixth component is equal to 1 minus the adjusted saturation component, which is 1−S'. And, the sum of the value of the first component, the value of the second component, the value of the third component, the value of the fourth component, the value of the fifth component and the value of the sixth component is 1. In the aforementioned situation, only the color region component having the color corresponding to this image element assigned to it, and the sixth component have a non-zero value, and the sum of these two is 1.

Generally, the foregoing achromatic color feature is indicative of the amount of white light with respect to the color contained in an image element. The amount of this component may work to make the difference between color saturation and level visible in viewing. In a regular image element, color of the same hue but different saturation can appear to be considerably different. For example, compare between a highly bright red color and a dark red color, their hue component would be reasonably close, but differ drastically in terms of saturation. The reason for this is because their white light discrepancy is too large, so it is common to define the achromatic color feature to help extract the features having more color characteristics.

In another aspect, when the color contained in a color element is categorized into any of the foregoing 5 fuzzy regions, the color feature component designated to the image element comprises a first component, a second component, a third component, a fourth component, a fifth component, and a sixth component. The value of the sixth component is 1 minus the adjusted saturation component, which is 1−S'. And, the sum of the value of the first component, the value of the second component, the value of the third component, the value of the fourth component, the value of the fifth component, and the value of the sixth component is 1. Furthermore, only the two components of the two color regions corresponding to the two sides of the foregoing fuzzy region and the sixth component have a non-zero value, and the sum of these three is 1 Other than these, the value of the two components of the two color regions corresponding to the two sides of the foregoing fuzzy region are determined according to the following formula:

$$C=S'*Belongingness;$$

Wherein, C represents a value of the component, S' represents an adjusted saturation component, belongingness represents degree of belonging, and the degree of belonging is found by the following formula:

$$Belongingness = \frac{U-H}{U-L};$$

Wherein, U represents, among two boundaries of the fuzzy region on the color plane, an angle contained by the boundary far away from the color region that the first component corresponds to, L represents an angle contained by the boundary close to the color region that the first component corresponds to, and H represents the angle contained by the hue component on the color plane.

Further, the color feature extraction method of the present invention further comprises a step (F) to conduct a low-pass filtering process. Wherein, the low-pass filtering process passes color feature vectors through an N×N median filter, and N is a positive integer between 3 and 9, but is preferably 5, inessential noise can be filtered out through the use of this N×N median filter on the color feature vectors of each image element.

Other objects, advantages, and novel features of the invention will become more apparent from the following detailed description when taken in conjunction with the accompanying drawings.

BRIEF DESCRIPTION OF THE DRAWINGS

FIG. 1 is a flowchart illustrating the method for color feature extraction according to an embodiment of the present invention;

FIG. 2A is a schematic view illustrating the process of respectively mapping the colors of two image pixels contained in an image signal to a color plane of an HSI color space, for respectively clustering the colors of the two image pixels into a color region or a fuzzy region;

FIG. 2B is a schematic view illustrating the process of designating the first image pixel with a color feature vector according to the clustering result as illustrated in FIG. 2A;

FIG. 2C is a schematic view illustrating the process of designating the second image pixel with a color feature vector according to the clustering result as illustrated in FIG. 2A;

DETAILED DESCRIPTION OF THE PREFERRED EMBODIMENT

Figure 3:
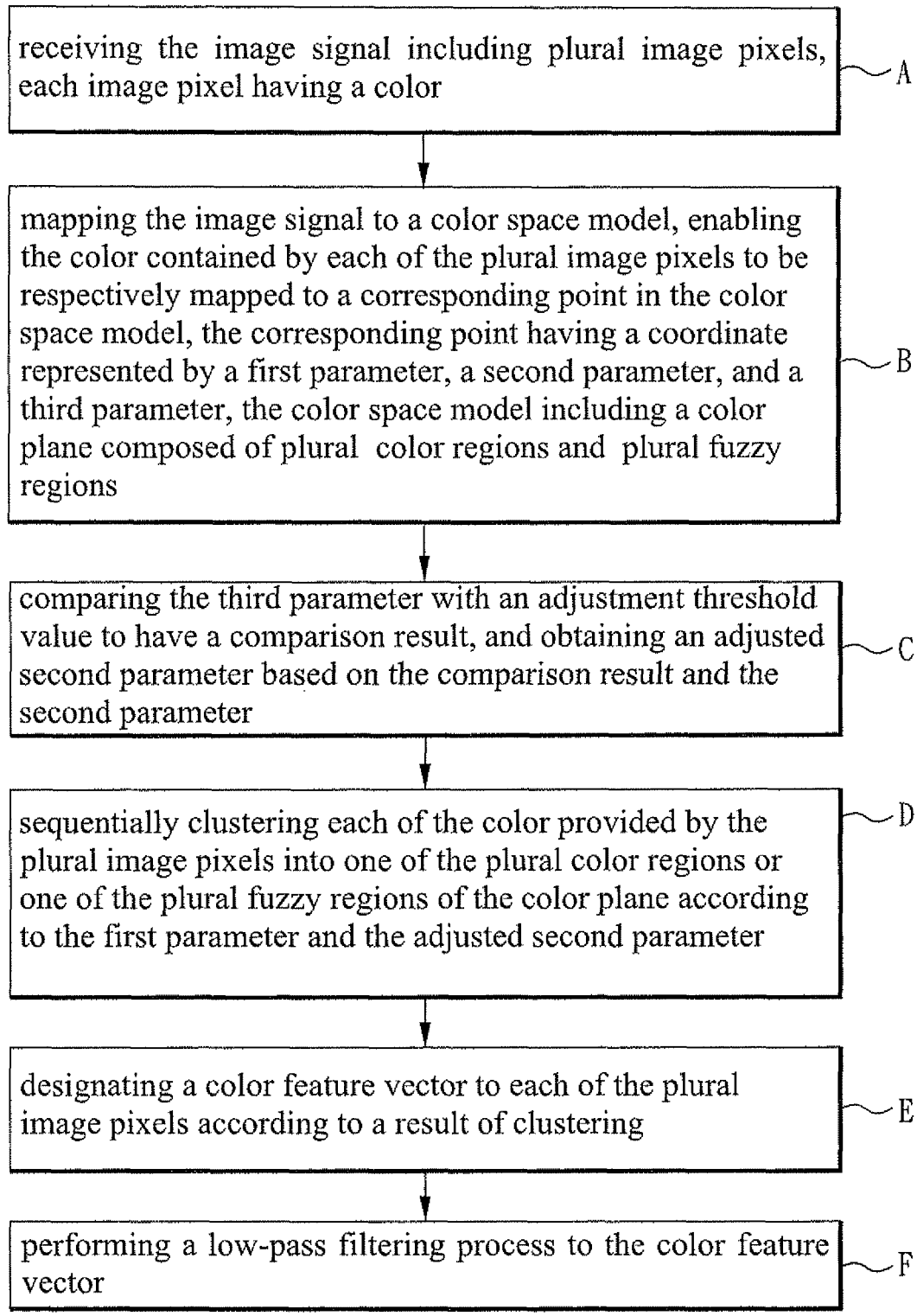
FIG. 3 is a flowchart illustrating another embodiment of the method for color feature extraction according to the present invention.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

Embodiment 1

With reference to FIG. 1, there is shown a flowchart illustrating the method for color feature extraction according to an embodiment of the present invention, and the method for color feature extraction comprises the following steps:

(A) receiving the image signal including plural image pixels, each image pixel having a color;

(B) mapping the image signal to a color space model, enabling the color contained by each of the plural image pixels to be respectively mapped to a corresponding point in the color space model, the corresponding point having a coordinate represented by a first parameter, a second parameter, and a third parameter, the color space model including a color plane composed of plural color regions and plural fuzzy regions;

(C) comparing the third parameter with an adjustment threshold value to have a comparison result, and obtaining an adjusted second parameter based on the comparison result and the second parameter;

(D) sequentially clustering each of the color provided by the plural image pixels into one of the plural color regions or one of the plural fuzzy regions of the color plane according to the first parameter and the adjusted second parameter; and (E) designating a color feature vector to each of the plural image pixels according to a result of clustering.

In the aforementioned step (A), the form of the image signal is not limited; the image signal can be represented by YcbCr420, or RGB444 form. Then, in step (B), the image signal is mapped to a color space model, allowing the color of each of the image pixels contained in the image signal to be represented by a first parameter, a second parameter, and a third parameter. It is to be noted that the form of the color space model is not limited; the color space can be an HSI color space model, an RGB color space model, a YUV color space model, or a CMY color space model.

The detailed description of how the colors of the two image pixels contained in an imaged signal are respectively to be mapped to a color plane of an HSI color space model for clustering the colors into a color region or a fuzzy region in the method for color feature extraction according to the present invention will be depicted as follows.

Please refer to FIG. 2A first, which is a schematic view illustrating the process of respectively mapping the colors of two image pixels contained in an image signal to a color plane of an HSI color space, for clustering the colors of the two image pixels into a color region or a fuzzy region.

As shown in FIG. 2A, a color plane of an HSI color space model in the method for color feature extraction according to the present invention is segmented into 5 color regions. The 5 color regions are respectively to be a first color region, a second color region, a third color region, a fourth color region, and a fifth color region, wherein each of the color regions corresponds to a color. In this embodiment, the first color region is a red color region 21, the second color region is a green color region 22, the third color region is a cyan color region 23, the fourth color region is a blue color region 24, and the fifth color region is a magenta color region 25.

In the color plane as shown in FIG. 2A, the angle range of the red color region 21 is between 350° and 10°, the angle range of the green color region 22 is between 95° and 120°, the angle range of the cyan color region 23 is between 170° and 190°, the angle range of the blue color region 24 is between 230° and 250°, and the angle range of the magenta color region 25 is between 290° and 310°. It is to be noted that the angle range of each aforementioned color region can be altered according to different practical demand, and this implies that the angle range is not merely limited to the above implementation. Moreover, on the color plane as shown in FIG. 2A, the region located between two adjacent color regions is defined as fuzzy region (region that is not covered by the 5 color regions). For example, the region located between the first color region and the second color region, or the region located between the third color region and the fourth color region. Therefore, the color plane as illustrated in FIG. 2A carries 5 color regions and 5 fuzzy regions.

In this embodiment, the two image pixels contained in the image signal are respectively a first image pixel and a second image pixel, and each of these two image pixels has a color as recorded in step (A) of the method for color feature extraction according to the present invention.

As mentioned in step (B) of the method for color feature extraction according to the present invention, the aforementioned image signal is mapped to an HSI color space model, for allowing the first image pixel and the second image pixel to be respectively mapped to a corresponding point in the HSI color space model. In the present embodiment, the corresponding point P1 of the color that the first image pixel carries has a coordinate in the HSI color space model and the coordinate is represented as (105°, 0.75, 90), while the corresponding point P2 of the color that the second image pixel carries has a coordinate in the HSI color space model and the coordinate is represented as (130°, 0.625, 85), wherein the first parameter represents hue component value, the second parameter represents saturation component value, and the third parameter represents intensity component value.

Then, as mentioned in step (C) of the method for color feature extraction according to the present invention, the third parameters of the corresponding points P1 and P2, which are the intensity component, are compared with an adjustment threshold value to have a comparison result. With the comparison result and the second parameters that P1 and P2 carried, adjusted second parameters for P1 and P2 are then obtained based on the comparison result and the second parameters, wherein the second parameter is the saturation component. In this embodiment, the above-mentioned adjustment threshold value is 85. Moreover, when the intensity component value of respective corresponding points P1 and P2 is higher then the adjustment threshold value, the adjusted saturation component is determined by the following formula:

$$S'=a+b*S, \quad (1)$$

where S' represents the adjusted saturation component, S represents the saturation component, and a and b are two arbitrary positive numbers and satisfy a condition of a+b=1. In this embodiment, formula 1 can further be re-written to:

$$S'=0.2+0.8*S \quad (2)$$

where a=0.2 and b=0.8. In other embodiments, a and b can be other values such as a=0.3 and b=0.7.

On the other hand, when the intensity component value of respective corresponding points P1 and P2 is not higher than the adjustment threshold value, the adjusted saturation component is then determined by the following formula:

$$S' = (a+b*S)*\left(\frac{I}{T}\right), \quad (3)$$

where S' represents the adjusted saturation component, S represents the saturation component, T represents the adjustment threshold value, and a and b are two arbitrary positive numbers and satisfy a condition of a+b=1. In this embodiment, formula 3 can further be re-written to:

$$S' = (0.2+0.8*S)*\left(\frac{I}{85}\right), \quad (4)$$

where a=0.2 and b=0.8. In other embodiments, a and b can be other values such as and b=0.7. Likewise, although the adjustment threshold value T is set to be 85, it can be other value such as 80 or 90.

As mentioned previously, the corresponding point P1 for the color of the first image pixel has a coordinate (105°, 0.75, 90) in the HSI color space model, while the corresponding point P2 for the color of the second image pixel has a coordinate (130°, 0.625, 85) in the HSI color space model. Since the intensity component of P1 is 90 and which is higher than 85, an adjusted saturation component is then determined by formula (2) and which is to be 0.8. Hence, the coordinate of corresponding point P1 on color plane as shown in FIG. 2A is represented as (105°, 0.8). Additionally, since the intensity component of P2 is 85 and which is not higher than 85, an adjusted saturation component is then determined by formula (2) and which is to be 0.7. Hence, the coordinate of corresponding point P2 on the color plane as shown in FIG. 2A is represented as (130°, 0.7).

With reference to step (D) of the method for color feature extraction according to the present invention, the colors carried by the two image pixels are then clustered into one of the five color regions or one of the five fuzzy regions of the color plane, as shown in FIG. 2A. in accordance with the first parameter and the adjusted second parameter of respective corresponding points P1 and P2, where the first parameter and the adjusted second parameter are respectively the hue component and the adjusted saturation component.

As illustrated in FIG. 2A, corresponding point P1 has a coordinate (105°, 0.8), and P1 is then clustered into green color region 22, while corresponding point P2 has a coordinate (130°, 0.7), and P2 is therefore clustered into fuzzy region 26 that is located between the green color region 22 and the cyan color region 23.

Finally, as mentioned in step (E) of the method for color feature extraction according to the present invention, a color feature vector is designated to each of the two image pixels according to a result of clustering. When the color of an image pixel is clustered into any one of the five color regions, the color feature vector designated to this image pixel will include a first component, a second component, a third component, a fourth component, a fifth component, and a sixth component. Moreover, in this embodiment, the first component corresponds to the red color region 21, the second component corresponds to the green color region 22, the third component corresponds to the cyan color region 23, the fourth component corresponds to the blue color region 24, the fifth component corresponds to the magenta color region 25, and the sixth component corresponds to an achromatic region.

Besides, the value of the sixth component is one subtracted by the adjusted saturation component, i.e. 1−S'. Furthermore, the summation of values of the first to sixth components is 1. In this embodiment, only the sixth component and the component corresponding to the color region to which the color of the image pixel is clustered have non-zero value, and the summation of the value of the two components is 1.

However, when the color of an image pixel is not clustered into any one of the five color regions, but is clustered into any one of the five fuzzy regions, the color feature vector designated to this image pixel will include a first component, a second component, a third component, a fourth component, a fifth component, and a sixth component as well. In addition, the value of the sixth component is one subtracted by the adjusted saturation component, i.e. 1−S'. Moreover, the summation of values of the first to sixth components is 1. In the present invention, only the sixth component and the two components corresponding to the color region located at the two sides of the fuzzy region have non-zero value, and the summation of the value of the three components is 1.

As shown in FIG. 2B, since corresponding point P1 is clustered into green color region 22, this leads to only the sixth component and the second component that corresponds to green color region 22 to have non-zero value. Additionally, as mentioned above, the adjusted saturation component of corresponding point P1 is 0.8; therefore, in the color feature vector of corresponding point P1, the second component that corresponds to green color region 22 is 0.8. Accordingly, the sixth component is 0.2 (1−0.8=0.2). With the above description, the image pixel is designated with a color feature vector V1 represented as [0,0.8,0,0,0,0.2] according to the color of the image pixel.

On the other hand, since corresponding point P2 is clustered into fuzzy region 26 that is located between the green color region 22 and the cyan color region 23, this leads to only the sixth component, the second component that corresponds to green color region 22, and the third component that corresponds to cyan color region 23 to have non-zero value. Additionally, since the color of the image pixel is not clustered into one of the five color regions but appears to be in the situation of being clustered into the fuzzy region that is located between the green color region 22 and the cyan color region 23, the second component is then determined by the following formula:

$$C = Y'^* Belongingness, \quad (5)$$

where C represents the value of the first component, S' represents the adjusted saturation component, and Belongingness is determined by the following formula:

$$Belongingness = \frac{U - H}{U - L}, \quad (6)$$

where U represents, among two boundaries of the fuzzy region on the color plane, an angle contained by the boundary far away from the color region that the first component corresponds to, L represents an angle contained by the boundary close to the color region that the first component corresponds to, and H represents the angle contained by the hue component on the color plane.

Taking corresponding point P2 as instance, since P2 is clustered into the fuzzy region that is located between the green color region 22 and the cyan color region 23, belongingness with regards to the adjacent two color regions (which implies the green color region 22 and the cyan color region 23) should be respectively determined at the beginning. First, for determination of the green color region 22, since corresponding point P1 has the coordinate represented as (130°, 0.7), this indicates that the hue component of P1 has an angle of 130° on the color plane. Second, the fuzzy region has two boundaries, and an angle U contained by the boundary far away from the green color region 22 on the color plane is 170°. The other angle L contained by the boundary close to the green color region 22 on the color plane is 120°. Thus, the belongingness with regards to green color region 22 is determined as:

$$Belongingness = \frac{170 - 130}{170 - 120} = 0.8, \quad (7)$$

Therefore, since the adjusted saturation component of corresponding point P1 is 0.7, the second component that corresponds to green color region 22 can be determined as 0.7*0.8=0.56 based on the aforementioned formula (5) as shown in FIG. 2C.

Likewise, by the same definition, parameters for determining belongingness with regards to cyan color region 23 include: an angle U contained by the boundary far away from the cyan color region 23 on the color plane is 120°; and the other angle L contained by the boundary close to the cyan color region 23 on the color plane is 170°.

Thus, the belongingness with regards to cyan color region 23 is determined as:

$$Belongingness = \frac{120 - 130}{120 - 170} = 0.2. \quad (8)$$

Therefore, since the adjusted saturation component of corresponding point P2 is 0.7, the second component that corresponds to cyan color region 23 can be determined as 0.7*0.2=0.14 based on the aforementioned formula (5) as shown in FIG. 2C. Moreover, since the adjusted saturation component is 0.7, the value of the sixth component is 0.3, i.e. 1−0.7=0.3. Hence, the image pixel is designated with a color feature vector V2 represented as [0,0.56,0.14,0,0,0.3] according to the color of the image pixel.

To sum up the above description, the method for color feature extraction according to an embodiment of the present invention can precisely extract a color feature vector representative of the color of the image pixel contained in an image signal, such as V1 [0,0.8,0,0,0,0.2] and V2 [0,0.56,0.14,0,0, 0.3], and then designate the two color feature vectors to the corresponding image pixel. Additionally, even the color of an image pixel is clustered into the fuzzy region of a color plane, such as the aforementioned corresponding point P1, the method for color feature extraction according to the present invention can still extract a color feature vector that can represent the color, for preventing color recognition error due to discrepancy on color sensing.

Embodiment 2

With reference to FIG. 3, there is shown a flowchart illustrating the method for color feature extraction according to another embodiment of the present invention, and the method for color feature extraction comprises the following steps:

(A) receiving the image signal including plural image pixels, each image pixel having a color;

(B) mapping the image signal to a color space model, enabling the color contained by each of the plural image pixels to be respectively mapped to a corresponding point in the color space model, the corresponding point having a coordinate represented by a first parameter, a second parameter, and a third parameter, the color space model including a color plane composed of plural color regions and plural fuzzy regions;

(C) comparing the third parameter with an adjustment threshold value to have a comparison result, and obtaining an adjusted second parameter based on the comparison result and the second parameter;

(D) sequentially clustering each of the color provided by the plural image pixels into one of the plural color regions or one of the plural fuzzy regions of the color plane according to the first parameter and the adjusted second parameter;

(E) designating a color feature vector to each of the plural image pixels according to a result of clustering; and (F) performing a low-pass filtering process to the color feature vector.

The detailed description of how the colors of the two image pixels contained in an imaged signal are respectively to be mapped to a color plane of an HSI color space model for clustering the colors into a color region or a fuzzy region in the method for color feature extraction according to the present invention will be depicted as follows.

Figure 4A:
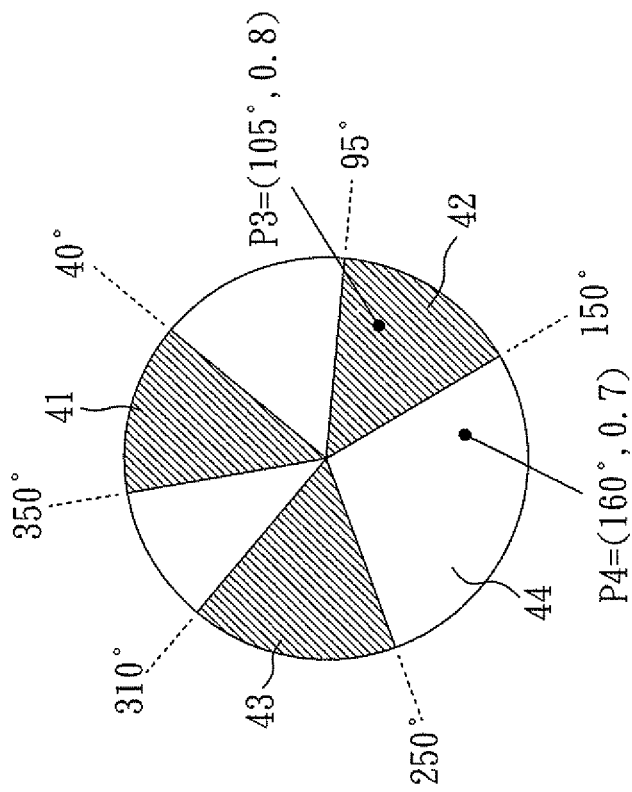
FIG. 4A is a schematic view illustrating the process of respectively mapping the colors of two image pixels contained in an image signal to a color plane of an HSI color space, for clustering the colors of the two image pixels into a color region or a fuzzy region.

Please refer to FIG. 4A, in which a color plane of an HSI color space model in the method for color feature extraction is segmented into 3 color regions, and the 3 color regions are respectively to be a first color region, a second color region, and a third color region, wherein each of the color regions corresponds to a color. In this embodiment, the first color region corresponds to red color region 41, the second color region corresponds to green color region 42, and the third color region corresponds to blue color region 43.

In the color plane as shown in FIG. 4A, the angle range of the red color region 41 is between 350° and 40°, the angle range of the green color region 42 is between 95° and 150°, and the angle range of the blue color region 23 is between 250° and 310°. It is to be noted that the angle range of each aforementioned color region can be altered according to different practical demand, and this implies that the angle range is not merely limited to the above implementation. Moreover, on the color plane as shown in FIG. 4A, the region located between two adjacent color regions is defined as fuzzy region (region that is not covered by the 3 color regions). For example, the region located between the first color region and the second color region, or the region located between the second color region and the third color region. Therefore, the color plane as illustrated in FIG. 4A carries 3 color regions and 3 fuzzy regions.

In this embodiment, the two image pixels contained in the image signal are respectively a third image pixel and a fourth image pixel, and each of these two image pixel has a color as recorded in step (A) of the method for color feature extraction according to the present invention.

As mentioned in step (B) of the method for color feature extraction according to the present invention, the aforementioned image signal is mapped to an HSI color space model, for allowing the third image pixel and the fourth image pixel to be respectively mapped to a corresponding point in the HSI color space model. In the present embodiment, the corresponding point P3 of the color that the first image pixel carries has a coordinate in the HSI color space model and the coordinate is represented as (105°, 0.75, 90), while the corresponding point P4 of the color that the fourth image pixel carries has a coordinate in the HSI color space model and the coordinate is represented as (130°, 0.625, 85), wherein the first parameter represents hue component value, the second parameter represents saturation component value, and the third parameter represents intensity component value.

Then, as mentioned in step (C) of the method for color feature extraction according to the present invention, the third parameters of the corresponding points P3 and P4, which are the intensity component, are compared with an adjustment threshold value to have a comparison result. With the comparison result and the second parameters that P3 and P4 carried, adjusted second parameters for P3 and P4 are then obtained based on the comparison result and the second parameters, wherein the second parameter is the saturation component. In this embodiment, the above-mentioned adjustment threshold value is 85. The procedure of obtaining adjusted saturation component has been described accurately in the previous paragraph and hence will not be described twice for convenience.

Therefore, after executing step (C) of the method for color feature extraction, corresponding point P3 for the color of the third image pixel in the HSI color space model has a coordinate represented as (105°, 0.8), as shown in FIG. 4A. On the other hand, corresponding point P4 for the color of the third image pixel in the HSI color space model has a coordinate represented as (160°, 0.7), as shown in FIG. 4A.

With reference to step (D) of the method for color feature extraction, the color carried by the two image pixels are then clustered into one of the three color regions or one of the three fuzzy regions of the color plane as shown in FIG. 4A in accordance with the first parameter and the adjusted second parameter of respective corresponding points P3 and P4, where the first parameter and the adjusted second parameter are respectively the hue component and the adjusted saturation component.

As illustrated in FIG. 4A, corresponding point P3 has a coordinate (105°, 0.8), and P3 is then clustered into green color region 42, while corresponding point P4 has a coordinate (160°, 0.7), and P4 is therefore clustered into fuzzy region that is located between the green color region 42 and the blue color region 43. Then, as mentioned in step (E) of the method for color feature extraction according to the present invention, a color feature vector is designated to each of the two image pixels according to a result of clustering. The procedure of designating a color feature vector to image pixel has been described in the previous embodiment and hence a detailed description for this embodiment is deemed unnecessary.

As mentioned above, since corresponding point P3 is clustered into green color region 42, the color feature vector designated to the image pixel corresponding to the point P3 will include a first component, a second component, a third component, and a fourth component, as shown in FIG. 4A. In this embodiment, the first component corresponds to the red color region 41, the second component corresponds to the green color region 42, the third component corresponds to the blue color region 43, and the fourth component corresponds to an achromatic region. In addition, the value of the fourth component is one subtracted by the adjusted saturation component, i.e., $1-S'$. Furthermore, the summation of values of the first to fourth components is 1. In the present embodiment, only the fourth component and the component corresponding to the color region to which the color of the image pixel is clustered (which means the second component) have non-zero value, and the summation of the value of the two components is 1.

Figure 4B:
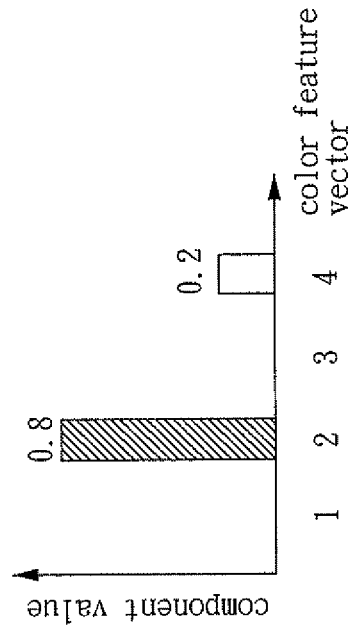
FIG. 4B is a schematic view illustrating the process of designating the third image pixel with a color feature vector according to the clustering result as illustrated in FIG. 2A.

As shown in FIG. 4B, the adjusted saturation component of corresponding point P3 is 0.8 and therefore, in the color feature vector of corresponding point P3, the second component that corresponds to green color region 42 is 0.8. Accordingly, the fourth component is 0.2. i.e., 1−0.8=0.2. With the above description, the image pixel is designated with a color feature vector V3 represented as [0,0.8,0,0.2] according to the color of the image pixel.

On the other hand, since corresponding point P4 is clustered into fuzzy region 44 that is located between the green color region 42 and the blue color region 43, this leads to only the fourth component, the second component that corresponds to green color region 42, and the third component that corresponds to blue color region 43 to have non-zero value.

The essential procedure of obtaining belongingness when the color of an image pixel is not clustered into one of the three aforementioned color regions and the procedure of obtaining the components respectively corresponding to the green color region 42 and the blue color region 43 have been described in the previous embodiment and thus a detailed description for this embodiment is deemed unnecessary.

Figure 4C:
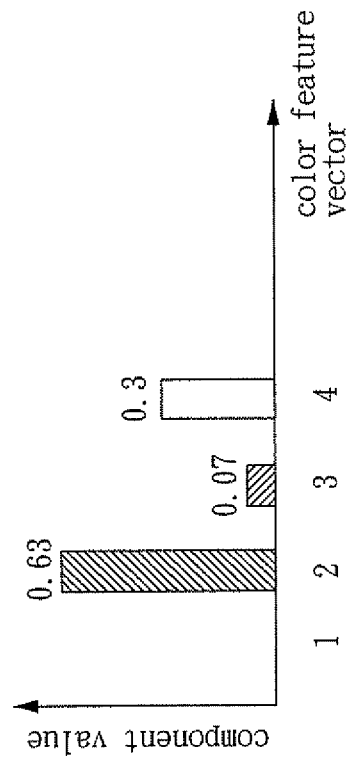
FIG. 4C is a schematic view illustrating the process of designating the fourth image pixel with a color feature vector according to the clustering result as illustrated in FIG. 2A.

Therefore, the belongingness with regards to green color region 42 of corresponding point P4 is 0.9, so that the second component that corresponds to green color region 42 can be determined as 0.7*0.9=0.63, as shown in FIG. 4C. Likewise, the belongingness with regards to blue color region 43 of corresponding point P4 is 0.1, so that the third component that corresponds to blue color region 43 can be determined as 0.7*0.1=0.07. Moreover, since the adjusted saturation component is 0.7, the fourth component is then to be 0.3, i.e. 1−0.7=0.3. By the above description, the image pixel is designated with a color feature vector V4 represented as [0,0.63, 0.07,0.3] according to the color of the image pixel.

Finally, as mentioned in step (F) of the method for color feature extraction, a low-pass filtering process is performed on the color feature vectors, for filtering out residual noise that exists in the color feature vectors (such as V3 and V4). In this embodiment, the low-pass filtering process is provided to pass the color feature vectors through an N×N median filter, where N is 5. This implies that the color feature vectors V3 and V4 are sent to a 5×5 median filter for filtering out inessential noise To sum up the above description, the method for color feature extraction of the present invention can precisely extract a color feature vector representative of the color of the image pixel contained in an image signal, such as V3 [0,0.8, 0,0.2] and V4 [0,0.63,0.07,0.3], and then designate the two color feature vectors to the corresponding image pixel. Additionally, even the color of an image pixel is clustered into the fuzzy region of a color plane such as the aforementioned corresponding point P1, the method for color feature extraction of the present invention can still extract a color feature vector that can represent the color, for preventing color recognition error due to discrepancy on color sensing.

Although the present invention has been explained in relation to its preferred embodiment, it is to be understood that many other possible modifications and variations can be made without departing from the spirit and scope of the invention as hereinafter claimed.

What is claimed is:

1. A method for color feature extraction implemented by a computer, adopted to extract color feature from an image signal, comprising the steps of:
(A) the computer receiving the image signal including plural image pixels, each image pixel having a color;
(B) the computer mapping the image signal to a color space model, enabling the color contained by each of the plural image pixels to be respectively mapped to a corresponding point in the color space model, the corresponding point having a coordinate represented by a first parameter, a second parameter, and a third parameter, the color space model including a color plane composed of plural color regions and plural fuzzy regions;
(C) the computer comparing the third parameter with an adjustment threshold value to have a comparison result, and obtaining an adjusted second parameter based on the comparison result and the second parameter;
(D) the computer sequentially clustering each of the color provided by the plural image pixels into one of the plural color regions or one of the plural fuzzy regions of the color plane according to the first parameter and the adjusted second parameter; and
(E) the computer designating a color feature vector to each of the plural image pixels according to a result of clustering.

2. The method for color feature extraction as claimed in claim 1, wherein the color space model is an HIS color space model, the first parameter represents a hue component, the second parameter represents a saturation component, and the third parameter represents an intensity component.

3. The method for color feature extraction as claimed in claim 2, wherein the adjustment threshold value is between 70 and 90; when the intensity component is higher than the adjustment threshold value, the adjusted saturation component is determined by the following formula:

$$S'=a+b*S,$$

where S' represents the adjusted saturation component, S represents the saturation component, and a and b are two arbitrary positive numbers and satisfy a condition of a+b=1; when the intensity component is not higher than the adjustment threshold value, the adjusted saturation component is determined by the following formula:

$$S' = (a + b*S)*\left(\frac{I}{T}\right),$$

where S' represents the adjusted saturation component, S represents the saturation component, T represents the adjustment threshold value, and a and b are two arbitrary positive numbers and satisfy a condition of a+b=1.

4. The method for color feature extraction as claimed in claim 3, wherein the plural color regions include a first color region, a second color region, a third color region, a fourth color region, and a fifth color region, each of the plural color regions corresponds to a color, and a portion on the color plane that is not covered by the plural color regions represents the plural fuzzy regions.

5. The method for color feature extraction as claimed in claim 4, wherein the first color region is a red color region, the second color region is a green color region, the third color region is a cyan color region, the fourth color region is a blue color region, and the fifth color region is a magenta color region.

6. The method for color feature extraction as claimed in claim 4, wherein when the color provided by one of the plural image pixels is clustered into one of the plural color regions, the color feature vector designated to one of the plural image pixels includes a first component, a second component, a third component, a fourth component, a fifth component, and a sixth component, while the first component, the second component, the third component, the fourth component, and the fifth component correspond to each of the plural color regions respectively, and a value of the sixth component is one subtracted by the adjusted saturation component; a summation of values of the first to sixth components is 1.

7. The method for color feature extraction as claimed in claim 4, wherein when the color provided by one of the plural image pixels is clustered into one of the plural fuzzy regions, the color feature vector designated to one of the plural image pixels includes a first component, a second component, a third component, a fourth component, a fifth component, and a sixth component, the first and second components correspond respectively to two color regions, and the color regions are respectively located at two sides of one of the plural fuzzy regions where the color provided by each of the plural image pixels is clustered; the first component, the second component, the third component, the fourth component, and the fifth component correspond to each of the plural color regions respectively, and a value of the sixth component is one subtracted by the adjusted saturation component; a summation of values of the first to sixth components is 1.

8. The method for color feature extraction as claimed in claim 7, wherein the value of the first component is determined by the following formula:

$$C=S'*\text{Belongingness},$$

where C represents the value of the first component, S' represents the adjusted saturation component, and Belongingness is determined by the following formula:

$$Belongingness = \frac{U-H}{U-L},$$

where U represents, among two boundaries of the fuzzy region on the color plane, an angle contained by the boundary far away from the color region that the first component corresponds to, L represents an angle contained by the boundary close to the color region that the first component corresponds to, and H represents the angle contained by the hue component on the color plane.

9. The method for color feature extraction as claimed in claim 1, further comprising a step of: (F) performing a low-pass filtering process to the color feature vector.

10. The method for color feature extraction as claimed in claim 9, wherein the low-pass filtering process is provided to pass the color feature vector through an N×N median filter, where N is a positive integer between 3 and 9.

* * * * *